2,806,834
Patented Sept. 17, 1957

2,806,834

COPOLYMERS OF POLYESTERS CONDENSED WITH XYLENE-FORMALDEHYDE RESINS, MODIFIED BY TREATMENT WITH POLYMERIZABLE UNSATURATED COMPOUNDS AND METHOD OF MAKING SAME

Günther Nischk, Leverkusen, and Karl E. Müller, Leverkusen-Bayerwerk, Germany, assignors to Farbenfabriken Bayer Aktiengesellschaft, Leverkusen, Germany, a corporation of Germany No Drawing. Application May 20, 1954,
Serial No. 431,280

11 Claims. (Cl. 260—45.4)

The present invention relates to a new process of preparing copolymers.

The condensation of unsaturated dicarboxylic acids and glycols yields high molecular weight unsaturated polyesters which are capable of producing copolymers with vinyl and allyl compounds. The unsaturated components of these polyesters are substantially maleic acid and fumaric acid. Adipic acid, phthalic acid, succinic acid and other saturated acids are mostly incorporated during condensation to allow the properties of the ultimate copolymers to be varied within wide limits. Especially suitable glycols are ethylene glycol, diethylene glycol or butanediol.

The unsaturated polyesters prepared by thermal condensation are mixed with unsaturated compounds such as vinyl or allyl compounds, especially styrene, methyl methacrylate, phthalic acid diallylester and copolymerized in the presence of catalysts, for instance peroxides.

In accordance with the invention mixed condensation products of unsaturated dicarboxylic acids, polyalcohols, especially glycols, and xylene formaldehyde resins are copolymerized with polymerizable unsaturated compounds, for instance vinyl compounds including allyl compounds. The xylene formaldehyde resins split off water and formaldehyde in the formation of these mixed condensation products, since resins of a more or less high molecular weight which contain acetal groups are formed in the condensation of xylenes.

These acetal groups are split up in the ester condensation and react with the carboxyl group of the unsaturated and saturated acids as well as with the hydroxyl groups of the glycols with the formation of polyesters of high molecular weight.

The production of these modified polyesters may be carried out by adding the xylene-formaldehyde resins to the unsaturated acids and glycols and condensing the mixture in known manner to give a polyester. Another method consists in preesterifying the unsaturated dicarboxylic acids with glycols to yield first a high molecular weight condensation product containing carboxyl and hydroxyl groups; this condensation product is then condensed with the xyleneformaldehyde resins. If glycols containing ether groups, as for instance diethylene glycol, or triethylene glycol, are concurrently employed in the condensation of the above-described modified polyesters, molded products, which are completely hardened on the surface, are obtained after addition of vinyl compounds, polymerization catalysts and preferably soluble cobalt salts such as cobalt naphthenate or cobalt chloride. By incorporating tertiary amines, for instance those proposed in copending application Ser. No. 320,342, filed by Günther Nischk, Karl E. Müller and Otto Bayer on November 13, 1952, now Patent No. 2,740,764, polymerization can be initiated by means of peroxides at room temperature.

The unsaturated polyesters containing xyleneformaldehyde resins which are obtained according to the invention, are light-yellow colored, clear products which are readily soluble in vinyl and allyl compounds. The copolymerization of these solutions initiated by peroxides yields completely glass-clear, almost colorless molded products with excellent mechanical properties.

The invention is further illustrated by the following examples, the parts being by weight.

Example 1

98 parts of maleic anhydride, 148 parts of phthalic anhydride, 106 parts of diglycol, 100 parts of glycol and 100 parts of xylene-formaldehyde resin are heated to 200° C. in a stream of nitrogen until the transition temperature has dropped to 80° C. and the production of esterification water gradually decreases. The transition temperature is the temperature to which the aqueous vapor distilled out of the reaction vessel passes to the condenser. As esterification proceeds, water is split off and the water vapor which results leaves the reaction vessel at a temperature of 100° C. Towards the end of the reaction the amount of water which is liberated decreases and the temperature of the vapor phase drops slowly. When a temperature of 80° C. is reached, it is indicative of the fact that the removal of water is over and esterification is substantially complete. A vacuum is then applied carefully, and the pressure is further reduced as the production of esterification water decreases, until a pressure of 14 mm. Hg is reached. The mixture is now heated at 14 mm. Hg at an inside temperature of 200° C. for another 2 hours. The vacuum is released, 0.35 part of hydroquinone are added at 130° C., 215 parts of styrene are added at 100° C., and the liquid is thoroughly stirred. The solution thus obtained is copolymerized with 1% of benzoyl peroxide at 100° C.

The copolymer thus obtained has the following mechanical properties:

| Impact strength, kg./cm.² | Flexural strength, kg./cm.² | Brinell hardness | | Compressive strength, kg./cm.² |
|---|---|---|---|---|
| 11.9 | 1,066 | 10″ 1,310 | 60″ 1,150 | 1,996 |

Example 2

98 parts of maleic anhydride, 148 parts of phthalic anhydride, 106 parts of diglycol, 70 parts of glycol and 100 parts of xylene-formaldehyde resin are condensed, first without vacuum and subsequently with the application of vacuum, as described in Example 1. After esterification 0.35 part of hydroquinone and 200 parts of styrene are added at 130° C. and the liquid is thoroughly stirred. By copolymerizing the solution with 1% of benzoyl peroxide, very light-colored moldings of excellent mechanical properties are obtained.

| Impact strength, kg./cm.² | Flexural strength, kg./cm.² | Brinell hardness | | Compressive strength, kg./cm.² |
|---|---|---|---|---|
| 14.9 | 1,141 | 10″ 1,620 | 60″ 1,530 | 2,656 |

Example 3

98 parts of maleic anhydride, 148 parts of phthalic anhydride, 106 parts of diglycol, 70 parts of glycol and 200 parts of xylene-formaldehyde resin are thermally esterified as described in Example 1. After condensation a light-yellow colored resin is obtained, which is well stirred with 0.41 part of hydroquinone at 130° C. and with 285 parts of styrene at 100° C. After copolymerizing with 1% of benzoyl peroxide at 100° C. very light colored moldings of the following mechanical properties are obtained:

| Impact strength, kg./cm.² | Flexural strength, kg./cm.² | Brinell hardness | | Compressive strength, kg./cm.² |
| --- | --- | --- | --- | --- |
| 6.1 | 788 | 10″ 1,580 | 60″ 1,460 | 2,556 |

*Example 4*

148 parts of phthalic anhydride, 98 parts of maleic anhydride, 106 parts of diglycol and 66 parts of glycol are condensed at an inside temperature of 200° C. while passing nitrogen over the mixture until the transition temperature has dropped to 80° C. and little more of the water formed during esterification distills over in the nitrogen. Thereafter, vacuum is applied and the pressure reduced slowly to 14 mm. Hg. After esterifying for another two hours at 200° C. and 14 mm. Hg the product is cooled. The polyester obtained is light-yellow colored and contains carboxyl and hydroxyl groups. 400 parts of this polyester are mixed with 100 parts of xylene-formaldehyde resin and brought gradually to higher temperature (up to 200° C.), while a vacuum of 14 mm. is applied at the same time. The xylene-formaldehyde resin is at first incompatible with the unsaturated polyester, but upon further heating it is converted gradually into the polyester, and water and formaldehyde are split off. After two hours the product is cooled, the vacuum removed, and 0.35 part of hydroquinone and 210 parts of styrene are added at 130° C. The copolymer obtained with 1% of benzoyl peroxide is very light-colored and shows the following mechanical properties:

| Impact strength, kg./cm.² | Flexural strength, kg./cm.² | Brinell hardness | | Compressive strength, kg./cm.² |
| --- | --- | --- | --- | --- |
| 27.2 | 1,485 | 10″ 1,560 | 60″ 1,450 | 1,982 |

*Example 5*

400 parts of the unsaturated polyester of Example 4 are mixed with 200 parts of xylene formaldehyde resin and then condensed as described in Example 4. A light-yellow colored resin is obtained, which is mixed with 0.36 part of hydroquinone and 245 parts of styrene. After copolymerizing with 1% of benzoyl peroxide a light-yellow colored moulding with the following mechanical properties is obtained:

| Impact strength, kg./cm.² | Flexural strength, kg./cm.² | Brinell hardness | | Compressive strength, kg./cm.² |
| --- | --- | --- | --- | --- |
| 7.8 | 1,078 | 10″ 1,390 | 60″ 1,250 | 1,818 |

*Example 6*

400 parts of the unsaturated polyester of Example 4 are mixed with 150 parts of xylene formaldehyde resin and heated to 200° C. at 14 mm. Hg for two hours as described in Example 4, water distilling over during this time. After that time the product is cooled and 0.35 part of hydroquinone is added at 130° C. and 235 parts of styrene are added at 100° C. The copolymerization is carried out with 1% of benzoyl peroxide at 100° C. The molding thus obtained has the following mechanical properties:

| Impact strength, kg./cm.² | Flexural strength, kg./cm.² | Brinell hardness | | Compressive strength, kg./cm.² |
| --- | --- | --- | --- | --- |
| 15.2 | 1,109 | 10″ 1,490 | 60″ 1,380 | 2,018 |

We claim:
1. A process for the production of copolymers which comprises reacting (1) a condensation product of an ethylenically unsaturated dicarboxylic acid, a polyhydric alcohol and a xylene-formaldehyde resin with (2) a polymerizable organic compound having an ethylenic double bond.
2. The process of claim 1, wherein the organic compound having a polymerizable double bond is a vinyl compound.
3. A process for the production of copolymers which comprises reacting (1) a condensation product of an ester obtained from an ethylenically unsaturated dicarboxylic acid and a polyhydric alcohol and a xylene-formaldehyde resin with (2) a polymerizable organic compound having an ethylenic double bond.
4. A process for the production of copolymers which comprises reacting (1) a condensation product of an ethylenically unsaturated dicarboxylic acid, a dicarboxylic acid having no aliphatic carbon to carbon unsaturation, a polyhydric alcohol and a xylene-formaldehyde resin with (2) a polymerizable organic compound having an ethylenic double bond.
5. A composition of matter comprising (1) a condensation product of an ethylenically unsaturated dicarboxylic acid, a polyhydric alcohol and a xylene-formaldehyde resin and (2) a polymerizable organic compound having an ethylenic double bond.
6. A composition of matter comprising (1) a condensation product of an ethylenically unsaturated dicarboxylic acid, a dihydric alcohol, and a xylene-formaldehyde resin and (2) a polymerizable organic compound of the group consisting of styrene, methyl methacrylate and phthalic acid diallylester having an ethylenic double bond.
7. A composition of matter comprising (1) a condensation product of an ethylenically unsaturated dicarboxylic acid, a dicarboxylic acid devoid of aliphatic carbon to carbon unsaturation, a polyhydric alcohol and a xylene-formaldehyde resin and (2) a polymerizable organic compound having an ethylenic double bond.
8. A copolymer of (1) a condensation product of an ethylenically unsaturated dicarboxylic acid, a dihydric alcohol, and a xylene-formaldehyde resin and (2) a polymerizable organic compound having an ethylenic double bond.
9. A copolymer of (1) a condensation product of an ethylenically unsaturated dicarboxylic acid, a polyhydric alcohol and a xylene-formaldehyde resin and (2) a polymerizable organic compound having an ethylenic double bond.
10. A copolymer of (1) a condensation product of an ethylenically unsaturated dicarboxylic acid, a dihydric alcohol, and a xylene-formaldehyde resin and (2) a polymerizable liquid organic compound of the group consisting of styrene, methyl methacrylate and phthalic acid diallylester having an ethylenic double bond.
11. A copolymer of (1) a condensation product of an ethylenically unsaturated dicarboxylic acid, a dicarboxylic acid devoid of polymerizable groups, a polyhydric alcohol and a xylene-formaldehyde resin and (2) a polymerizable organic compound having an ethylenic double bond.

References Cited in the file of this patent

FOREIGN PATENTS

| 863,412 | Germany | Jan. 19, 1953 |
| 871,646 | Germany | Mar. 26, 1953 |